United States Patent

Grünert et al.

[11] 4,298,184
[45] Nov. 3, 1981

[54] VALVE SEAL FOR A PRESSURE MEDIUM CONTROLLING VALVE

[75] Inventors: Wolfgang Grünert; Johann Huber, both of Munich; Kurt Rheindt, Freilassing, all of Fed. Rep. of Germany

[73] Assignee: Knorr-Bremse GmbH, Munich, Fed. Rep. of Germany

[21] Appl. No.: 127,860

[22] Filed: Mar. 6, 1980

[30] Foreign Application Priority Data

Mar. 6, 1979 [DE] Fed. Rep. of Germany ....... 2908631

[51] Int. Cl.³ .......................... F16K 25/00; F16J 9/06; F16J 15/22
[52] U.S. Cl. ..................................... 251/357; 277/152
[58] Field of Search ................... 277/84, 85, 152, 205; 251/357

[56] References Cited

U.S. PATENT DOCUMENTS 3,558,097  1/1971  DeFrees ............................ 251/357
4,089,533  5/1978  Knudson ........................... 277/152
4,172,585  10/1979  Rolfe ................................ 251/357

Primary Examiner—A. Michael Chambers
Attorney, Agent, or Firm—Edmund M. Jaskiewicz

[57] ABSTRACT

A pressure medium controlling valve has a valve member with an annular groove being formed in the surface of the valve member directed toward a valve seat. A resilient sealing ring is disposed within the annular groove and is opposed from the valve seat. The side of the annular groove facing toward the pressure medium is cylindrical and is engaged by the end of a resilient sealing lip attached to the outer peripheral surface of the sealing ring. The sealing lip extends angularly outwardly away from the sealing ring and toward the surface of the valve member directed toward the valve seat so that the outer end of sealing lip abuts resiliently against the cylindrical surface of the groove to form a seal therewith. The other side of the annular groove is provided with an undercut which receives a correspondingly shaped portion of the sealing ring.

3 Claims, 1 Drawing Figure

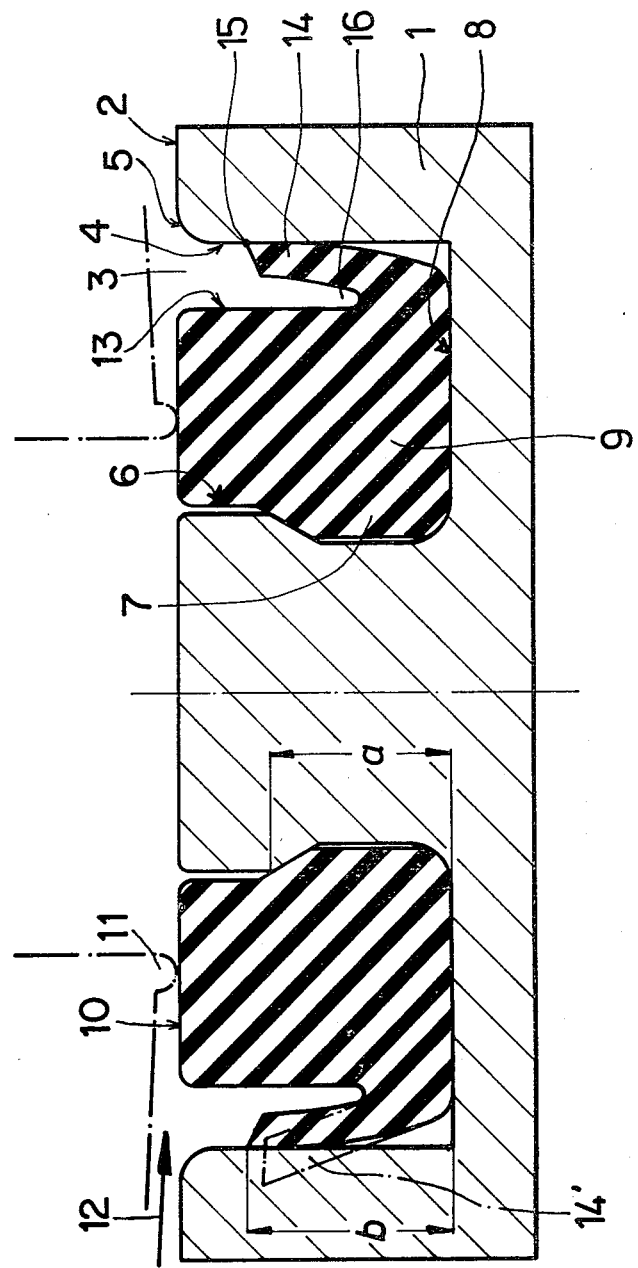

VALVE SEAL FOR A PRESSURE MEDIUM CONTROLLING VALVE

The present invention relates to a valve seal for a pressure controlling valve having a substantially rigid valve member, more particularly, to the structure of a sealing ring seated in an annular groove formed in the surface of the valve member directed toward the valve seat.

It has been known to provide a pressure medium controlling valve with a valve member in which is formed an annular groove and a sealing ring is seated in the annular groove so as to be opposed from a valve seat. Such a groove has been provided with a cylindrical side and an undercut side and the sealing ring is shaped to be received within the undercut side so as to secure the sealing ring in position. The use of such an undercut structure thus avoids the usual bonding, vulcanization or otherwise adhering the sealing ring into the annular groove. In such a valve seal the sealing ring is assembled under elastic deformation into the annular groove and then secured in position by engaging the undercut portion of the groove side wall. When the valve is closed with the sealing ring against the valve seat so as to shut out the pressure medium, the pressure medium can generally escape between a side wall of the annular groove and the sealing ring and press against the bottom surface of the annular groove to build a pressure cushion between the bottom of the groove and the sealing ring. When the valve is again opened, this pressure cushion will expand and in many instances will push the sealing ring out of the annular groove of the valve member.

It is therefore the principal object of the present invention to provide a novel and improved valve seal for a pressure medium controlling valve as described herein.

It is another object of the present invention to provide a valve seal for such a pressure medium controlling valve which avoids the build-up of a pressure cushion between the bottom of the groove and the sealing ring so that the sealing ring will not snap out of the groove and at the same time to avoid any leakage when the valve is closed.

According to one aspect of the present invention a valve seal for a pressure medium controlling valve may comprise a resilient sealing ring in an annular groove formed in the surface of the valve member which is directed toward the valve seat. The sealing ring has a peripheral surface which is adjacent a cylindrical side of the annular groove and is directed toward the pressure medium. A sealing lip has one end connected to a portion of this peripheral surface of the sealing ring away from the surface of the valve member directed toward the valve seat. The other end of the sealing lip extends angularly outwardly toward the valve member surface to abut resiliently against the groove cylindrical side so as to define a sealing edge. There is an annular space between the remaining portion of the peripheral side of the sealing ring and the sealing lip. The length of the sealing lip is substantially equal to the axial dimension of the sealing ring adjacent to the cylindrical side of the groove.

As result of this structure of the sealing ring the pressure medium acts against the sealing lip and the sealing edge of the sealing lip is pressed against the cylindrical side wall of the annular groove so that passage of the pressure medium to the annular surface is blocked. There will thus be no build-up of a pressure cushion between the bottom surface of the annular groove and the sealing ring. In addition, when the valve is closed this sealing ring structure prevents leakage by the flow of a pressure medium along the side of the sealing lip directed toward the pressure medium.

Other objects and advantages of the present invention will be apparent upon reference to the accompanying description when taken in conjunction with the following drawing, which is exemplary, and which is a radial sectional view of a valve member provided with a sealing ring according to the present invention.

In the drawing there is shown at 1 a valve member of a pressure medium controlling valve. The valve member 1 is plate or disk-shaped and may be flexible or rigid. The valve member has a surface 2 which is facing toward a valve seat which is indicated by the dashed lines 11. An annular groove 3 is formed in the surface 2 so that the groove opens upon the surface 2 of the valve member. The groove 3 has a radial outer side wall 4 which is cylindrical and connects through a rounded surface portion 5 to the surface 2 of the valve member.

The groove 3 has a radial inner wall 6 in the bottom portion of which is formed an undercut 7. The bottom surface of the annular groove 3 forms a flat planar surface 8 the radially inner edge of which has a curved surface connection with the groove wall 6 and the radially outer surface edge has a sharp or angular connection with the groove wall 4.

In the annular groove 3 there is seated a sealing ring 9 of a resilient or flexible material and the peripheral surface of the sealing ring adjacent the groove wall 6 is provided with a projecting portion which conforms with and is received within the undercut 7. The sealing ring 9 has a radial outer surface 10 which is planar and substantially co-planar or flush with the valve member surface 2. The sealing ring surface 10 is opposed from valve seat 11 which is axially displaceable with respect to the valve member 1 and the sealing ring 9. The pressure medium which may be a gas, such as air, or a liquid which is to be controlled by the valve flows in a radially inward direction from a source radially outwardly of the valve member, as shown by the direction of the arrow 12. Thus, the high pressure side of the valve is radially outwardly of the valve seat 11.

Adjacent its surface 10, the outer peripheral surface of the sealing ring 9 comprises a cylindrical side wall 13 which is spaced radially from the cylindrical wall 4 of the annular groove 3. The cylindrical side wall 13 extends over approximately ⅔ of the axial dimension of the sealing ring 9. On the lower portion of the side wall 13 adjacent to the bottom 8 of the groove the sealing ring has formed integrally therewith a sealing lip of annular washer 14. This sealing lip 14 is elastically deformable and extends at an acute angle to the groove side 4 toward the upper surface 2 of the valve member such that the outer edge of the sealing lip, indicated at 15, constitutes a sealing edge which is resiliently urged and retained against the cylindrical side wall 4 of the annular groove. When the sealing ring is removed from the valve member and is in its free and unrestrained state, the sealing lip will extend in the position as indicated by the dashed lines 14'. The sealing lip 14 has a length of about ¾ of the depth of the annular slot 3. This length is also about ¾ of the axial dimension of the sealing ring 9. An annular space 16 is thus formed between the cylindrical side wall 13 of the sealing ring 9 and the inner surface of the sealing lip 14 and this annular space 16 opens toward the valve member surface 2.

In order to assemble the valve seal according to the present invention the sealing ring 9 is inserted into the annular groove 3 and will be held in place by its inner radial projection being seated within the undercut portion 7 of the annular groove 3. The flow of the pressure medium in the direction of the arrow 12 will cause a pressure build-up in the annular space 16 and this pressure build-up will press the sealing lip 14 with even greater force against the cylindrical side wall 4 of the annular groove and thus provide a pressure-tight contact between the sealing edge 15 and the side wall of the annular groove. In the closed position of the valve, as illustrated in the drawing, the pressure medium cannot escape past the sealing lip 14 and thus cannot flow between the groove surface 8 and the sealing ring 9. As result, there will be no pressure build-up between the bottom of the groove and the sealing ring.

In addition, the sealing ring 9 prevents any flow of the pressure medium around the sealing ring 9 along the areas of contact between the sealing ring and the annular groove. Thus, a cause of leakage of the closed valve is eliminated. When the valve is reopened, there will be no build-up of any pressure in the vicinity of the groove bottom surface 8. Thus, the assembly of the sealing ring within the groove is sufficient to secure the sealing ring in the valve member.

Since the sealing ring is assembled merely by seating the sealing ring in the annular groove so as to become engaged in the undercut wall of the groove, the assembly of the valve seal is very simple and worn or leaking sealing rings can be readily replaced.

It is particularly advantageous when the axial dimension a of the undercut 7 of the annular groove 3 corresponds to the length b of the sealing lip 14. This relationship simplifies and facilitates the assembly and disassembly of the sealing ring with respect to the valve member.

According to the present invention the sealing lip 14 should always be located on the pressure side of the valve. Thus, should the high pressure side of the valve be within the valve seat so that the flow of the pressure medium is radially outwardly in a direction opposite to that of the arrow 12, the sealing lip 14 would then be located on the inner peripheral surface of the sealing ring. For such a valve, the inner side of the groove would have the cylindrical surface to be engaged by the sealing lip 14 and the outer side of the groove would have the undercut surface.

The present invention can be used with other forms of valve members where the valve member does not have a continuous or planar surface 2 but which surface is connected to a plunger or pushrod. The groove side wall 6 may even form a portion of the outer wall of a plunger extending axially from the valve member surface 2. The valve member may also be provided with a plunger or pushrod in the form of a radially outwardly extending annular flange which might surround or enclose the plunger.

Thus, it can be seen that the present invention has provided an improved valve seal which can be easily assembled or disassembled from a valve member without any necessity for bonding or adhering agents but which at the same time prevents any leakage through the closed valve and prevents any build-up of pressure between the sealing ring and the bottom of the groove. Avoiding the build-up of pressure thus prevents any popping or snapping out of the sealing ring upon opening of the valve.

It will be understood that this invention is susceptible to modification in order to adapt it to different usages and conditions and, accordingly, it is desired to comprehend such modifications within this invention as may fall within the scope of the appended claims.

What is claimed is:

1. A valve seal for a pressure medium controlling valve comprising a valve member having a first surface directed toward a valve seat, there being an annular groove in said first surface and having a bottom surface, said annular groove further having a cylindrical first side directed toward the pressure medium and a second side with an undercut therein, a resilient sealing ring in said annular groove and having a first surface directed toward the valve seat, a first peripheral surface of said sealing ring being directed toward the pressure medium, an annular elastically deformable sealing lip having one end attached to a portion of said peripheral surface of the sealing ring away from said valve member first surface and adjacent said bottom surface of the groove and having a second end extending angularly outwardly toward said valve member first surface to abut resiliently against said groove cylindrical first side to define a sealing edge, there being an annular space between the remaining portion of said peripheral surface of the sealing ring and said sealing lip, the length of said sealing lip being about ¾ of the axial dimension of said sealing ring disposed adjacent said cylindrical side of the groove and corresponding to the depth of said annular groove, said sealing ring having a second peripheral surface directed toward said annular groove second side and shaped to conform to said second side such that said sealing ring is secured within said groove.

2. A valve seal as claimed in claim 1 wherein there is curved surface interconnecting said valve member first surface and said annular groove cylindrical side.

3. A valve seal as claimed in claim 1 wherein the axial dimension of the undercut in said second side of the annular groove is substantially equal to the length of said sealing lip.

* * * * *